(12) United States Patent
Yada

(10) Patent No.: US 7,899,876 B2
(45) Date of Patent: Mar. 1, 2011

(54) IMAGE PROJECTION DEVICE, IMAGE PROJECTION METHOD, COMPUTER READABLE RECORDING MEDIUM RECORDING PROGRAM USED IN IMAGE PROJECTION DEVICE

(75) Inventor: Yuki Yada, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 154 days.

(21) Appl. No.: 12/412,995

(22) Filed: Mar. 27, 2009

(65) Prior Publication Data

US 2009/0195708 A1   Aug. 6, 2009

Related U.S. Application Data

(63) Continuation-in-part of application No. PCT/JP2007/068712, filed on Sep. 26, 2007.

(30) Foreign Application Priority Data

Sep. 29, 2006   (JP) ............................. 2006-270129

(51) Int. Cl.
  *G06F 15/16* (2006.01)
  *G03B 21/00* (2006.01)
(52) U.S. Cl. ........................................ 709/206; 353/10
(58) Field of Classification Search ................. 709/206; 353/10; 345/7
See application file for complete search history.

(56) References Cited

U.S. PATENT DOCUMENTS

| | | | |
|---|---|---|---|
| 6,275,714 B1* | 8/2001 | Kintz et al. ............ 379/433.13 |
| 6,914,662 B2* | 7/2005 | Paige et al. ................... 352/41 |
| 7,069,057 B2* | 6/2006 | Ishibashi et al. ............... 353/79 |
| 2002/0026521 A1* | 2/2002 | Sharfman et al. ........... 709/231 |
| 2002/0067471 A1* | 6/2002 | Bhat .......................... 353/119 |
| 2003/0035086 A1* | 2/2003 | Robinson et al. .............. 353/10 |
| 2007/0030455 A1* | 2/2007 | Inoue .......................... 353/15 |
| 2008/0235574 A1* | 9/2008 | Telek et al. .................. 715/240 |
| 2008/0240017 A1* | 10/2008 | Kaidar et al. ............... 370/328 |
| 2009/0195708 A1* | 8/2009 | Yada .......................... 709/206 |

FOREIGN PATENT DOCUMENTS

JP   2001-282652   10/2001

(Continued)

OTHER PUBLICATIONS

International Search Report from PCT/JP2007/068712 dated Sep. 26, 2007.

*Primary Examiner*—Ajay Bhatia
(74) *Attorney, Agent, or Firm*—Banner & Witcoff, Ltd (57) ABSTRACT

An image projection device which can freely set access information to other devices which are connected to a communication network and exhibits excellent user-friendliness and secrecy is provided. An image projection device acquires image data via the communication network and projects an image based on the image data. The image projection device includes: a receiving unit which receives an E-mail transmitted from another device which is connected to the communication network and containing information on the image data; a content analyzing unit which analyzes a content of the E-mail received by the receiving unit; and an image data acquiring unit which acquires the image data via the communication network based on an analysis result obtained by the content analyzing unit.

10 Claims, 8 Drawing Sheets

FOREIGN PATENT DOCUMENTS

| | | |
|---|---|---|
| JP | 2002-149140 | 5/2002 |
| JP | 2002-247539 | 8/2002 |
| JP | 2003-018676 | 1/2003 |
| JP | 2004-013632 | 1/2004 |
| JP | 2004-212820 | 7/2004 |
| JP | 2004-219455 | 8/2004 |

* cited by examiner

ONE PRESENTATION FILE

HEADER PART
```
Subject: PRESENTATION
From: ito@example
Date: Mon, 3Jul 2006
```

TEXT
```
SALES
¥¥pc4¥share
ON SALES.ppt
1234
2006/7/5
```

Fig. 5B

A PLURALITY OF PRESENTATIONS

HEADER PART
```
Subject: PRESENTATION
From: ito@example
Date: Mon, 3Jul 2006
```

TEXT
```
SALES
¥¥pc4¥share
ON SALES.ppt
1234
2006/7/5

REPORT
¥¥pc5¥share
REPORT.ppt
1234
2006/7/5
```

Fig. 6

| PLACE | FIELD | RESULT OF ANALYSIS |
|---|---|---|
| HEADER PART | From | SENDER |
| HEADER PART | Date | DATE AND TIME OF TRANSMISSION |
| HEADER PART | Subject | TITLE OF MAIL |
| TEXT | FIRST ROW | TITLE OF PRESENTATION |
| TEXT | SECOND ROW | ADDRESS OF SHARED FOLDER |
| TEXT | THIRD ROW | NAME OF FILE |
| TEXT | FOURTH ROW | PASSWORD |
| TEXT | FIFTH ROW | DATE AND TIME OF PRESENTATION |

Fig. 8

IMAGE PROJECTION DEVICE, IMAGE PROJECTION METHOD, COMPUTER READABLE RECORDING MEDIUM RECORDING PROGRAM USED IN IMAGE PROJECTION DEVICE

CROSS-REFERENCE TO RELATED APPLICATIONS

The present application is a Continuation-in-Part of International Application PCT/JP2007/068712 filed on Sep. 26, 2007, which claims the benefits of Japanese Patent Application No. 2006-270129 filed Sep. 29, 2006.

BACKGROUND

1. Field

The present invention relates to an image projection device and an image projection method which projects an image based on image data acquired via a communication network, and a recording medium which records a program used in the image projection device.

2. Description of the Related Art

An image projection device such as a projector, for example, which is used in a conference room or the like has been known as a peripheral device of a PC (personal computer) which projects an image using a display output of the PC as an input. In using the image projection device in the conference room or the like, it is necessary to store image data of an image which is projected on the image projection device in a notebook-type PC and to carry the PC to the conference room, and such an operation is extremely cumbersome. Further, there exists a possibility that the PC is lost in the course of carrying the notebook-type PC to the conference room thus giving rise to a drawback that it is difficult to ensure secrecy from a viewpoint of prevention of leaking of information. It may be possible to reduce a burden imposed on a user by preliminarily installing an image projection device and a PC in a conference room and by carrying a recording medium such as a USB memory into the conference room. In this case, a drawback that a user has to carry the USB memory to the conference room still remains and a drawback that secrecy cannot be ensured also remains.

Accordingly, to overcome such a drawback, JP-A-2004-13632 (patent document 1) discloses an electronic conference system which enables the projection of an image based on image data acquired via a communication network without preserving image data in a PC, a USB memory or the like and carrying the PC, the USB memory or the like to the conference room. This electronic conference system is configured such that a server, a terminal device which transmits image data such as conference materials to the server, and an image projection device which is connected to the server are connected to a communication network. In this electronic conference system, image data is transmitted to the server from the terminal device, and the server allows the image projection device to project an image based on the received image data upon reception of the image data.

SUMMARY

However, in the above-mentioned electronic conference system, it is necessary to prepare the server in pair with the image projection device thus pushing up a cost of the whole electronic conference system. Further, in conveying the image projection device, it is necessary to convey the server simultaneously thus deteriorating the user-friendliness of the electronic conference system.

Accordingly, it is an object of the present invention to provide an image projection device or the like which can acquire image data via a communication network by a method which can be easily performed and exhibits excellent availability without requiring the above-mentioned server.

According to a first aspect of the present invention, there is provided an image projection device which is configured to acquire image data via a communication network and is configured to project an image based on the image data, the image projection device comprising: a receiving unit which is configured to receive an E-mail transmitted from another device which is connected to the communication network and containing information on the image data; a content analyzing unit which is configured to analyze a content of the E-mail received by the receiving unit; and an image data acquiring unit which is configured to acquire the image data via the communication network based on an analysis result obtained by the content analyzing unit.

According to another aspect of the present invention, there is provided a computer readable recording medium recording a program which is used in an image projection device which acquires image data via a communication network, and projects an image based on the image data, the program causing a computer to execute the steps of: for example, receiving an E-mail which is transmitted from another device which is connected to the communication network and contains information on the image data; analyzing a content of the received E-mail; and acquiring the image data via the communication network based on an analysis result of a content of the E-mail.

Further, according to still another aspect of the present invention, there is provided an image projection method which is configured to acquire image data via a communication network and is configured to project an image based on the image data, the image projection method comprising the steps of: receiving an E-mail which is transmitted from another device which is connected to the communication network and contains information on the image data; analyzing a content of the received E-mail; and acquiring the image data via the communication network based on an analysis result which is obtained by analyzing a content of the E-mail.

DETAILED DESCRIPTION OF THE INVENTION

Figure 1:
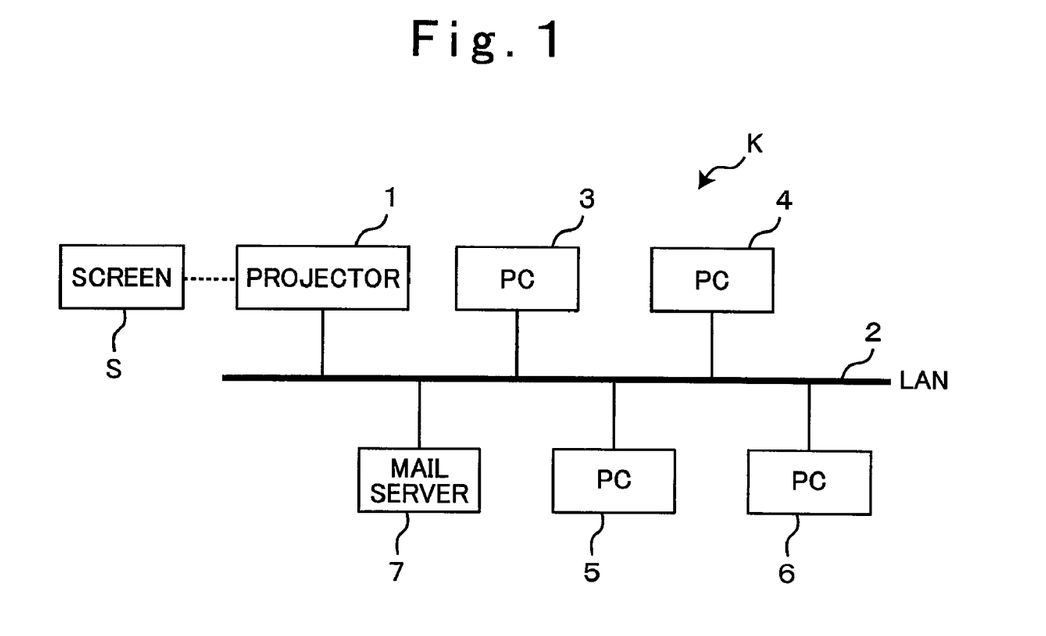
FIG. 1 is a view showing the constitution of a communication network system which includes an image projection device according to an embodiment of the present invention.
Figure 2:
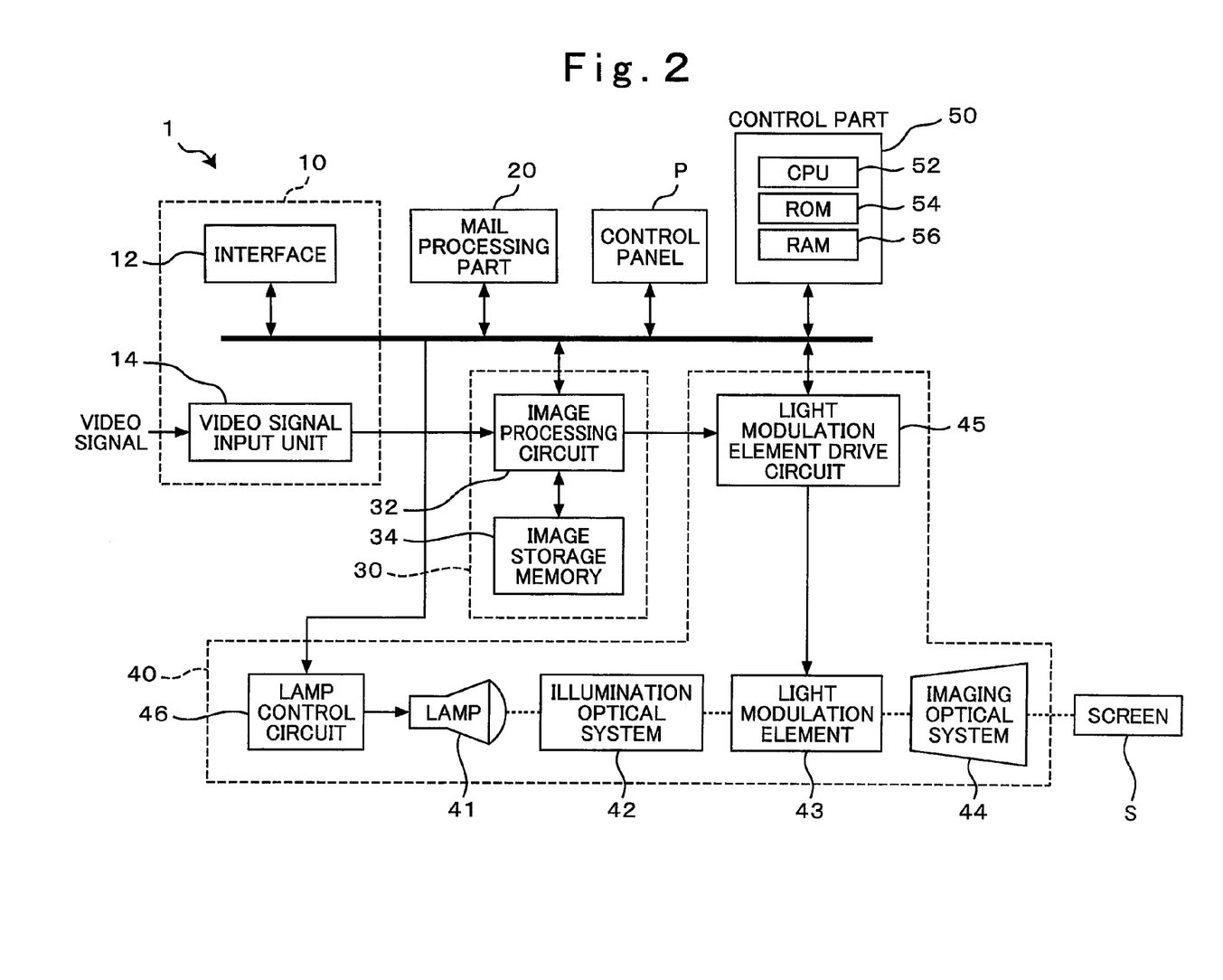
FIG. 2 is a block diagram showing the internal constitution of the image projection device according to the embodiment of the present invention.

Hereinafter, an embodiment of the present invention is explained in conjunction with attached drawings. FIG. 2 shows the schematic constitution of an image projection device 1 to which the present invention is applied. FIG. 1 shows the constitution of an image projection system K which includes the image projection device 1 according to the embodiment of the present invention.

The image projection system K includes an image projection device 1 which is represented by a projector or the like, a plurality of personal computers PC3 to PC6 which constitute other device, and a mail server 7, and these devices are communicably connected with the mail server 7 via a communication network 2 such as a LAN (Local Area Network). Although PC (Personal Computer), PDA (Personal Digital Assistants) or the like may be used as other device, the other device is constituted of PC in this embodiment.

Here, unique IP addresses of the same sub net are respectively assigned to the image projection device 1, the personal computers PC3 to PC6 and the mail server 7 and the communication among these devices is performed using the IP addresses.

An E-mail program for a client is stored in the image projection device 1, and the image projection device 1 receives an E-mail from the mail server 7 which is connected to the communication network 2 by executing this program.

Further, the image projection device 1 analyzes a content of the E-mail received from the mail server 7 by executing the above-mentioned E-mail program. Thereafter, based on an analysis result, the image projection device 1 acquires image data stored in any one of the PC3 to PC6 via the communication network 2, and projects an image based on the image data on the screen S.

Here, image data is defined as a concept which includes not only a usual image file such as a still picture file (for example: JPEG) or a motion picture file (for example: MPEG) but also data file or the like which can perform an image display by executing application software such as document forming software, presentation software or CAD software. That is, the term "image data" implies data with which the projection display can be performed by the image projection device 1.

In this manner, the image projection device 1 receives the E-mail which is transmitted from the PC3 to PC6 constituting other devices which are connected to the communication network 2 and contains information on image data, analyses a content of the received E-mail, and acquires image data from any one of the PC3 to PC6 based on the analyzed result via the communication network 2. Accordingly, without requiring a server for receiving image data and using the E-mail which is a simple communication method, the present invention can provide the image projection device with high user-friendliness which arbitrarily designate the image data stored in other device connected to the communication network and can automatically acquire the designated image data.

Hereinafter, the constitution and the manner of operation of the image projection device 1 are explained specifically.

The internal constitution of the image projection device 1 is explained. FIG. 2 is a block diagram showing the internal constitution of the image projection device 1. As shown in FIG. 2, the image projection device 1 includes an input part 10 to which information such as image data or video signals is inputted from the outside, a mail processing part 20 which executes various kinds of processing with respect to an E-mail received from the mail server 7 via the input part 10, an image processing part 30 which executes various kinds of processing to the image data or the video signals, a projection part 40 which is provided for projecting various kinds of images, a control panel P which allows a user to operate the image projection device 1, and a control part 50 which controls the whole image projection device 1.

The input part 10 includes an interface 12 such as a LAN interface which is provided to connect the image projection device 1 to a communication network 2, and a video signal input unit 14 which inputs a video signal inputted from the outside the image projection device 1 to an image processing part 30.

The mail processing part 20 has a function of receiving an E-mail from the mail server 7 based on a control by a control part 50 via the interface 12. The mail processing part 20 receives, for example, an E-mail containing information on image data transmitted from the PC3 connected to the communication network 2 from the mail server 7 based on the control by the control part 50 via the interface 12.

The information on image data contained in the E-mail includes, as described later, access information necessary for getting access to the device which stores image data via the communication network 2. As the access information, storing position specifying information for specifying a position at which the image data is stored (referred to as a position of the device or a storing position in the inside of the device in this specification), password information or user account name information necessary for getting access to a commonly-shared folder which the device storing the image data has and the like are named.

Further, the mail processing part 20 has a function of analyzing a content of a received E-mail. The mail processing part 20, upon reception of an E-mail containing information on image data connected to the communication network 2, based on a control by the control part 50, analyzes a content of the E-mail and extracts access information from the E-mail.

The image processing part 30 includes an image processing circuit 32 which converts image data acquired via the interface 12 or a video signal inputted to the video signal inputting unit 14 into an image signal which can be projected by the projection part 40, and an image storage memory 34 constituted of, for example, a VRAM (Video Random Access Memory) which temporarily stores the image signal obtained by conversion performed by the image processing circuit 32 and is accessed by the image processing circuit 32 and the like.

The projection part 40 includes a lamp 41 which constitutes a light source, an illumination optical system 42, an optical modulation element 43, an imaging optical system 44, an optical modulation element drive circuit 45, and a lamp drive circuit 46.

The lamp 41, based on a signal outputted from the lamp drive circuit 46 controlled by the control part 50, is turned on and emits light. Light emitted from the lamp 41 passes through a color filter not shown in the drawing, and is radiated to the optical modulation element 43 such as a transmissive liquid crystal panel as illumination light from the illumination optical system 42.

The optical modulation element 43 is driven by the optical modulation element drive circuit 45 so as to display an image on a display screen thereof. The image displayed on the display screen in this manner is radiated as light from the optical modulation element 43 due to the illumination light from the illumination optical system 42. Next, this radiated light passes through the imaging optical system 44 and an opening formed in a housing of the image projection device 1 not shown in the drawing and, thereafter, is projected on a screen S.

The control panel P is provided at a predetermined portion of the image projection device 1 not shown in the drawing so as to allow a user to operate the control panel P, and a user can perform various operation controls, operation stop controls and the like of the control part 50 by operating the control panel P.

The control panel P includes a file selection button switch not shown in the drawing which allows a user to select desired image data, a file display button switch not shown in the drawing which allows a user to execute file display processing described later and the like.

The control part 50 includes a CPU (Central Processing Unit) 52 which constitutes a central control part, a ROM (Read Only Memory) 54 which stores various programs and data to be executed by the CPU 52, and a RAM (Random Access Memory) 56 which temporarily stores arithmetic operation data based on a program to be executed by the CPU 52, and has a function of controlling the whole image projection device 1.

In the control part 50, the CPU 52 is connected with the ROM 54, the RAM 56 and the like, and the CPU 52 has a function of executing various processing in accordance with various kinds of processing stored in the ROM 54.

In the control part 50, the CPU 52 reads and executes an E-mail receiving program stored in the ROM 54 so as to control the mail processing part 20 thus receiving an E-mail from the mail server 7 via the interface 12, and stores the E-mail in the RAM 56. The control part 50, the interface 12 and the mail processing part 20 function as a receiving unit which receives an E-mail which is transmitted from other devices connected to the communication network 2 and contains information on image data. Here, the mail processing part 20 executes the communication with the mal server 7 using an IMAP (Internet Message Access Protocol).

Further, in the control part 50, the CPU 52 reads and executes an E-mail analyzing program stored in the ROM 54 so as to control the mail processing part 20 thus reading information on the E-mail stored in the RAM 56 and analyzing a content of the E-mail, and an analysis result of the E-mail is stored in the RAM 56. Here, the control part 50 and the mail processing part 20 function as a content analyzing unit which analyzes a content of an E-mail received by the receiving unit. The manner of operation of the content analyzing unit is explained in detail later.

Further, in the control part 50, the CPU 52 reads and executes a list table forming program stored in the ROM 54 so as to read the analysis result of the E-mail stored in the RAM 56, forms an E-mail list table which is a list table of information which contains at least a file name of image data out of access information contained in the E-mail based on the analysis result, and stores the E-mail list table in the RAM 56. Here, the control part 50 functions as the list table forming unit. The E-mail list table which is formed by the list table forming unit is configured to be projected on the screen S via the projection part 40 based on a control performed by the control part 50. Further, the E-mail list table may be configured to be displayed on a display part of the control part P not shown in the drawing.

Further, in the control part 50, when a user selects desired image data out of the above-mentioned E-mail list table by operating the control panel P, the CPU 52 reads and executes an image data acquisition program stored in the ROM 54 thus acquiring the selected image data from the interface 12 via the communication network 2, and stores the selected image data in the RAM 56. Here, the control part 50 and the control panel P function as the image data selecting unit. Further, the control part 50 and the interface 12 function as the image data acquisition unit.

The RAM 56 has, as explained above, the function of a storage part for storing the E-mail received from the mail server 7 by the mail processing part 20, the function of temporarily storing various flags and data and the like. Here, the E-mail receiving program, the E-mail analyzing program, the list table forming program, the image data acquiring program and the like, for example, may be downloaded to a recording device such as a RAM from a server or the like which is connected to the network via a network interface, or may be recorded in a recording medium such as a CD-ROM and, thereafter, may be read in a recording device such as a RAM via a recording medium drive not shown in the drawing.

Figure 3:
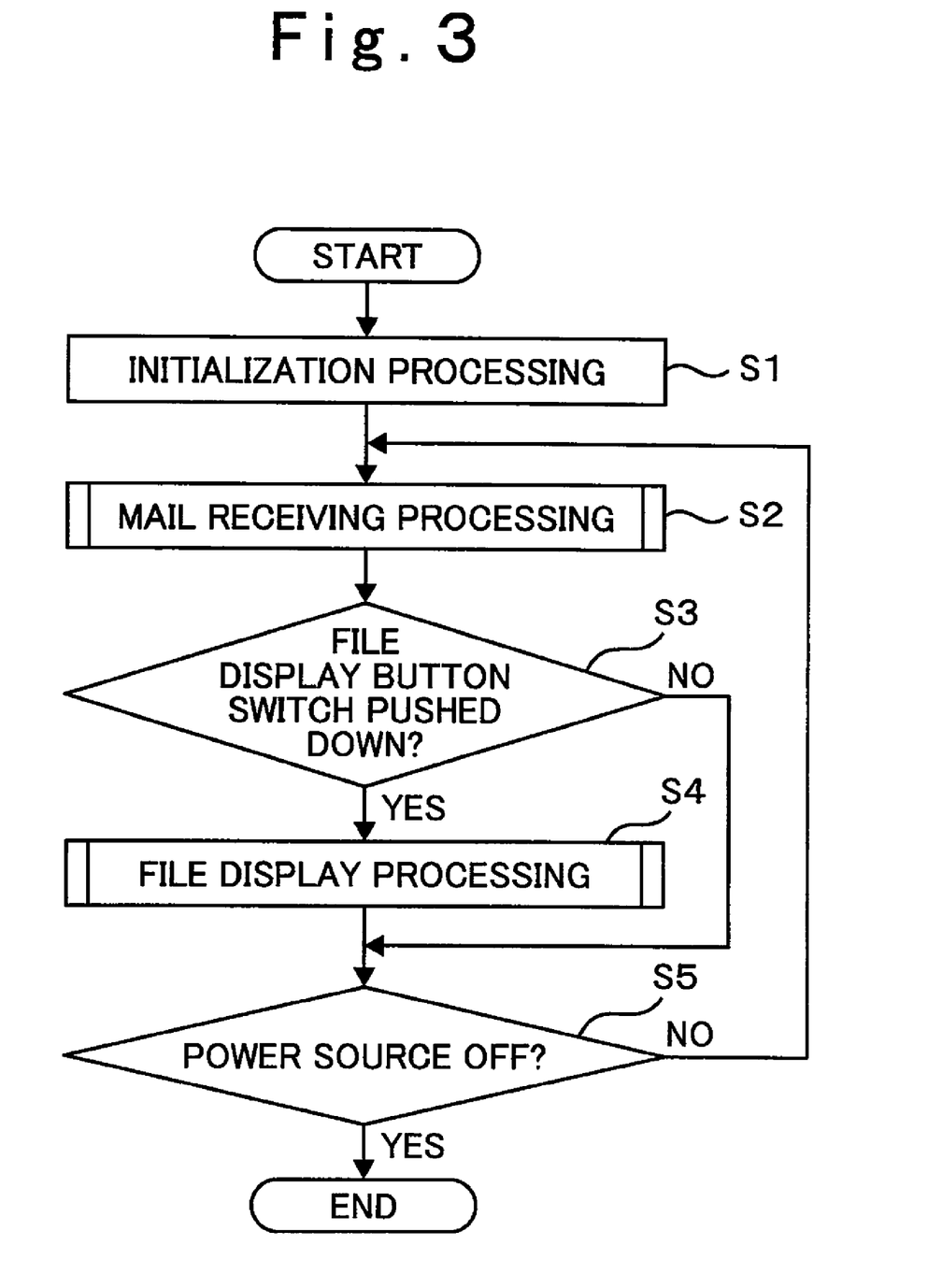
FIG. 3 is a flow chart of main processing of the image projection device of this embodiment.
Figure 4:
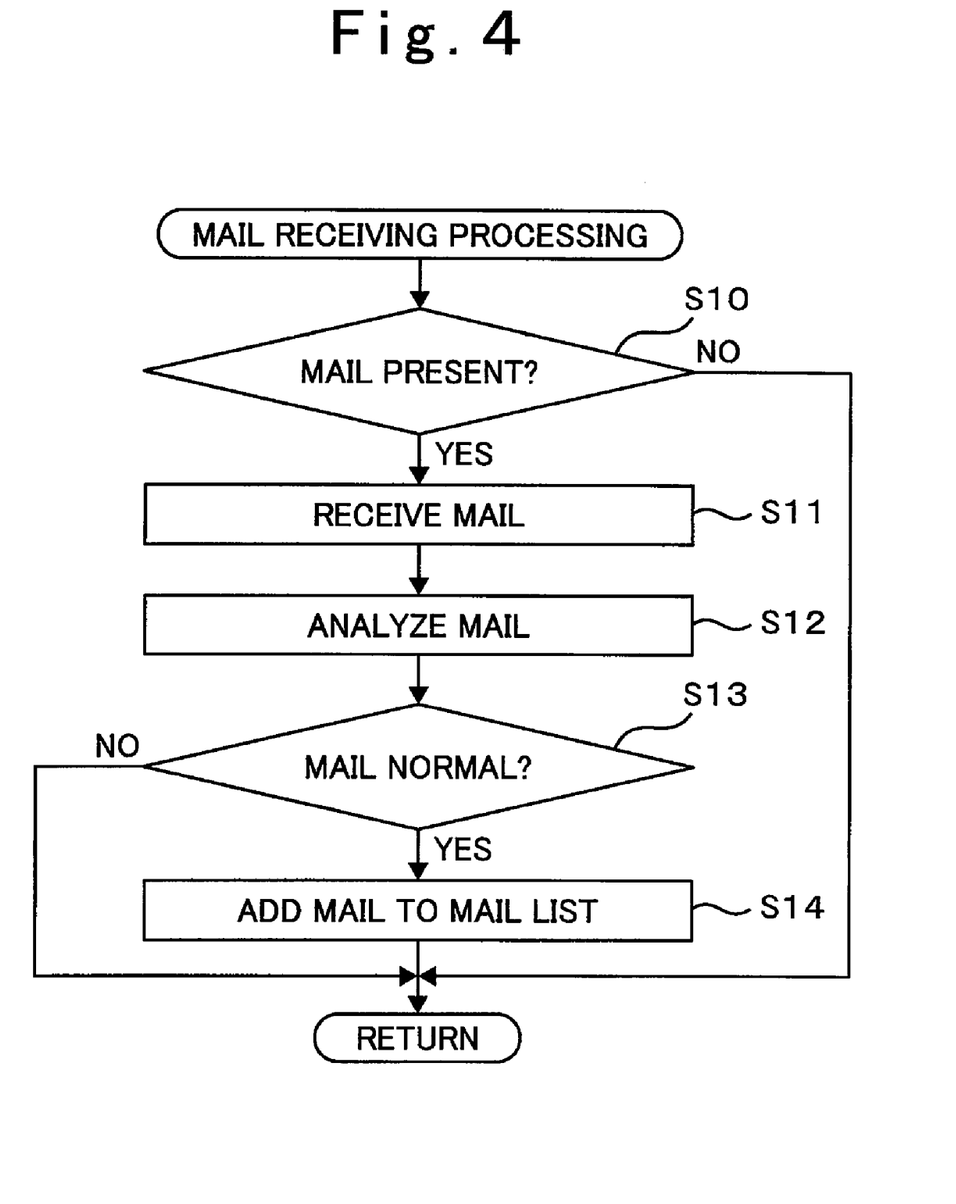
FIG. 4 is a flow chart of mail receiving processing of the image projection device of this embodiment.
Figure 5A:
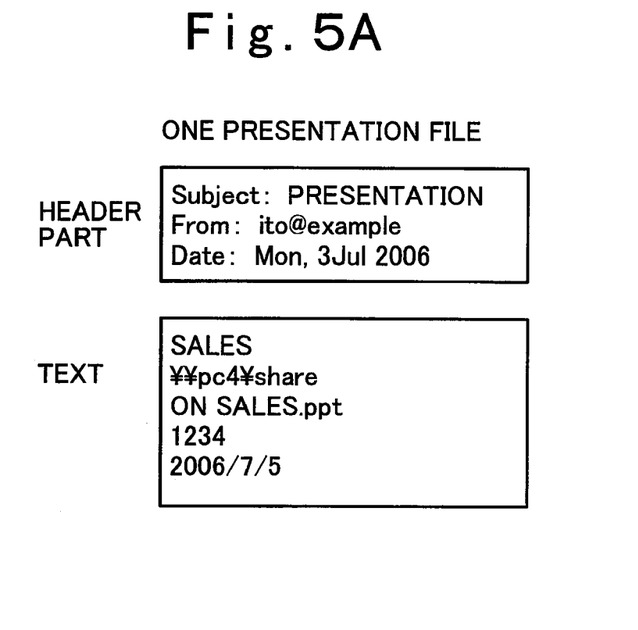
FIG. 5 is a view showing a constitutional example of an E-mail of this embodiment.
Figure 5B:
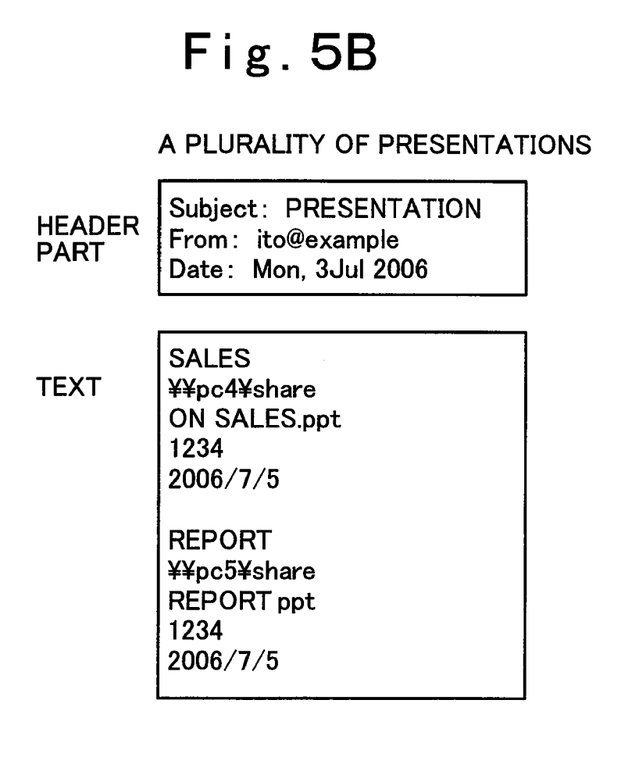
Figure 6:
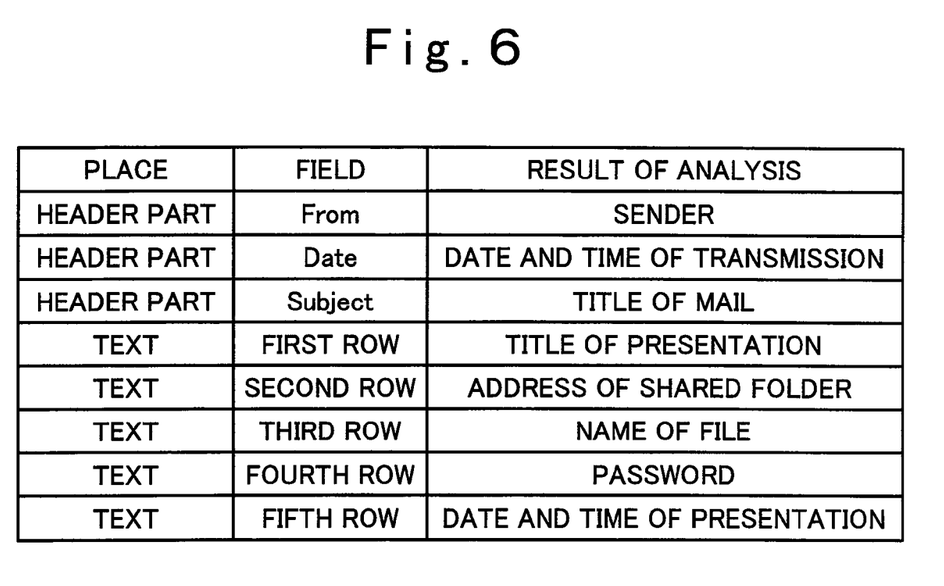
FIG. 6 is a view showing one example of an analysis result which analyzes a content of the E-mail of this embodiment.
Figure 7:
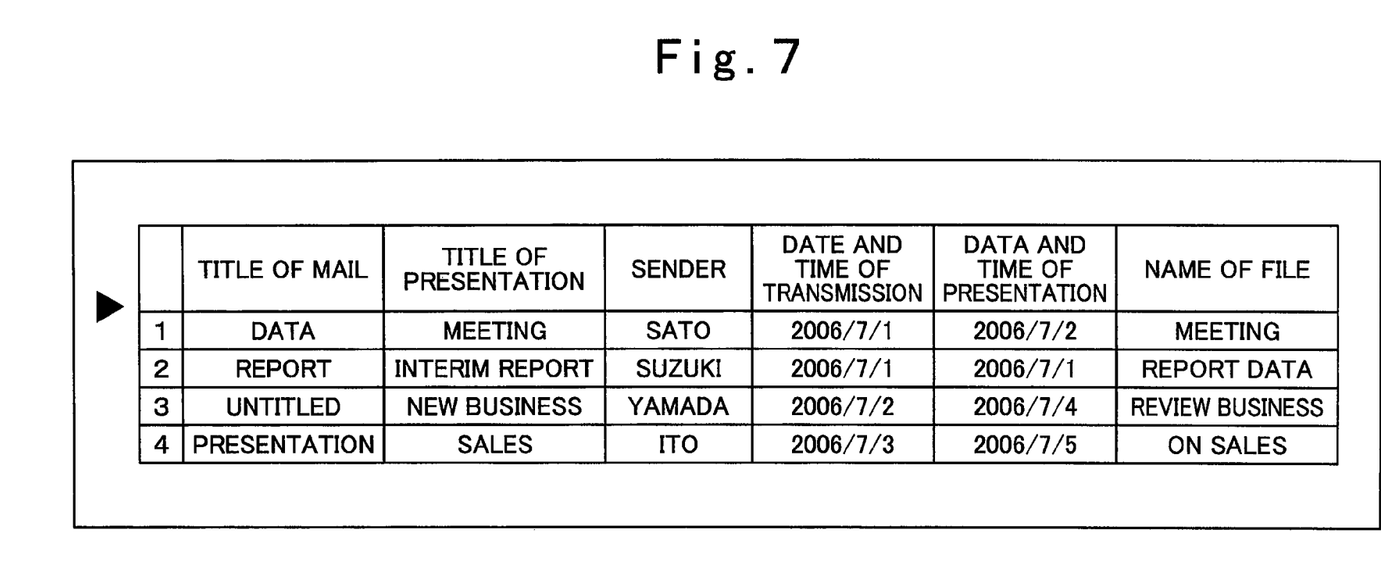
FIG. 7 is a view showing one example of a list table of information containing a file name of image data of this embodiment.
Figure 8:
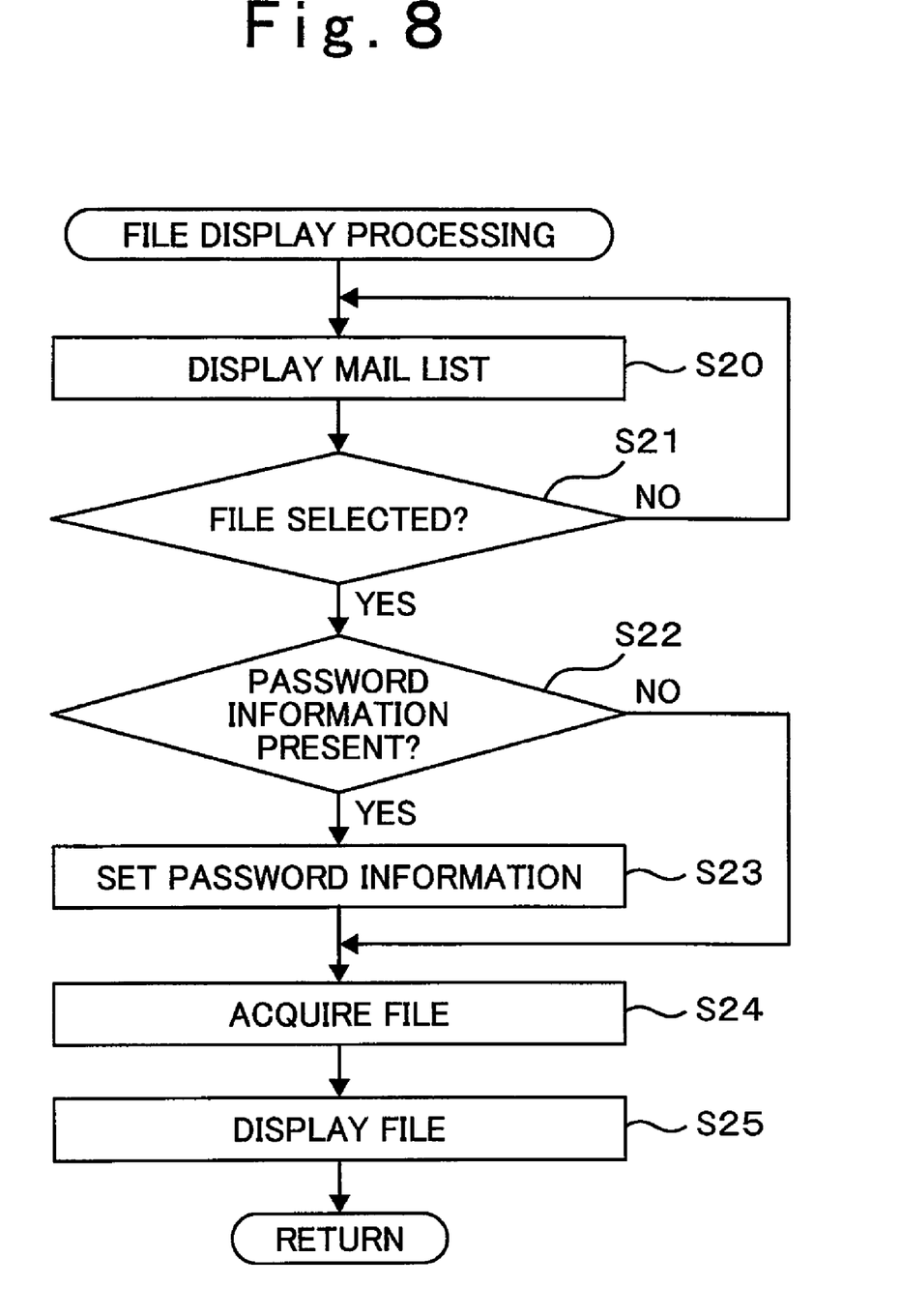
FIG. 8 is a flowchart of file display processing of this embodiment.

Next, in the image projection device 1 of this embodiment, as one example, the manner of operation in which image data for presentation is acquired and the acquired image data is projected is explained specifically in conjunction with FIG. 3 to FIG. 8. FIG. 3 is a flow chart of main processing of the image projection device 1 according to this embodiment. FIG. 4 is a flow chart of mail receiving processing of the image projection device 1 according to this embodiment. FIG. 5 is a view showing a constitutional example of an E-mail of this embodiment. FIG. 6 is a view showing one example of an analysis result which is obtained by analyzing a content of the E-mail of this embodiment. FIG. 7 is a view showing one example of a list table of information containing a file name of image data of this embodiment. FIG. 8 is a flowchart of file display processing of this embodiment.

As shown in FIG. 3, when a power source of the image projection device 1 is turned on, the CPU 52 of the image projection device 1 executes an initial setting operation such as initialization for permission of access to the RAM 56 and the sure acquisition of a working area, and brings the respective programs stored in the ROM 54 into a state in which these programs are executable by the CPU 52. After the CPU 52 completes the execution of the above-mentioned function as the control part 50 (step S1), the control part 50 advances processing to step S2.

In step S2, the control part 50 executes mail receiving processing. This mail receiving processing is processing in step S10 to S14 shown in FIG. 4 and is explained in detail later. When the mail receiving processing is finished, the control part 50 advances processing to step S3.

In step S3, the control part 50 determines whether or not the file display button switch of the control panel P not shown in the drawing is pushed down.

When the control part 50 determines that the file display button switch is pushed down in this processing, (step S3: Yes), the control part 50 executes file display processing (step S4). This file display processing is processing in step S20 to S25 shown in FIG. 8 and is explained in detail later. When the file display processing is finished, the control part 50 advances processing to step S5.

On the other hand, when the control part 50 determines that the file display button switch is not pushed down in this processing (step S3: No), the control part 50 advances processing to step S5.

In step S5, the control part 50 determines whether or not the power source of the image projection device 1 is turned off.

In this processing, when the control part 50 determines that the power source of the image projection device 1 is turned off (step S5: Yes), the control part 50 stops the operation of the image projection device 1 so as to finish the main processing.

On the other hand, when the control part 50 determines that the power source of the image projection device 1 is not turned off in this processing (step S5: No), the control part 50 advances processing to step S2 and repeats a series of processing from step S2.

Here, mail receiving processing in step S2 is explained specifically in conjunction with the flowchart shown in FIG. 4.

As shown in FIG. 4, when the mail receiving processing is started, in step S10, the control part 50 controls the mail processing part 20 and determines whether or not the E-mail addressed to the image projection device 1 is present in the mail server 7 connected to the communication network 2.

In this processing, when the control part 50 determines that the E-mail addressed to the image projection device 1 is not present (step S10: No), the control part 50 finishes the mail receiving processing.

On the other hand, when the control part 50 determines that the E-mail addressed to the image projection device 1 is present in this processing (step S10: Yes), the control part 50 advances processing to step S11.

In step S11, the control part 50 reads the E-mail receiving program from the ROM 54 and executes the E-mail receiving program so as to control the mail processing part 20 thus receiving the E-mail addressed to the image projection device 1 from the mail server 7 via the interface 12, stores the E-mail in the RAM 56, and advances processing to step S12.

The E-mail received from the mail server 7 via the interface 12 may be an E-mail transmitted from any one of PC3 to PC6 connected to the communication network 2, and it is not always necessary to receive the E-mail from the PC in which the image data is stored. Here, assume that the control part 50 receives the E-mail transmitted from the PC3 connected to the communication network 2.

Here, one example of the E-mail received by the control part 50 is shown in FIG. 5. The E-mail is, as shown in FIG. 5A, constituted of a header portion (also simply referred to as "header") and a body. The header portion of the E-mail contains information such as "presentation" which indicates a mail title, "ito@example" which indicates a transmitter, and "Mon, 3 Jul. 2006" which indicates date of transmission. Further, the body of the E-mail contains the title of the presentation (hereinafter referred to as "presentation title"), storage position specifying information for specifying the device in which image data is stored, and password information for getting access to a commonly-shared folder which the device storing the image data has. The body of the image data contains "sales" as information on the presentation title, "¥¥PC4" which indicates identification information on the device which stores the image data (being set to PC4 in this embodiment) as the storage position specifying information, "¥share" which indicates address information on the commonly-shared folder (being set to share in this embodiment) which this PC4 has, and "with respect to sales: ppt" which indicates the file name which is information for specifying the image data which the commonly-shared folder "share" has, "1234" which indicates password information for accessing to the commonly-shared folder "share", "2006/7/5" which indicates presentation date and time and the like.

In the example shown in FIG. 5A, in the storage position specifying information contained in the E-mail which the PC3 transmits, the device which stores the image data is set to the PC4. However, the device which stores the image data may be any one of the PC3, the PC5 and the PC6 which constitute other devices connected to the communication network 2. That is, depending on the information which the E-mail contains, it may be possible to arbitrarily designate either the image data stored in the own PC and the image data stored in the other PCs.

In this manner, the E-mail stored in the RAM 56, as the access information, contains the storage position specifying information which is configured to specify the PC which stores the image data out of a plurality of PCs which are connected to the communication network 2 and the store folder of the PC and the password information. With respect to the E-mail shown in FIG. 5A, there is shown an example in which the access information is contained in the body which constitutes the specified portion of the E-mail. However, the access information may be contained in the header portion of the E-mail. In this manner, the image projection device 1 of this embodiment can set the access information at a desired position of the E-mail thus enhancing user-friendliness of the user.

Further, in the E-mail shown in FIG. 5A, only "with respect to sales: ppt" is specified as the image data for presentation stored in the PC4. However, when a plurality of image data for presentation is necessary, as shown in FIG. 5B, a space of one row may be formed and information which contains the access information may be continuously formed in the body of the E-mail following the space thus specifying a plurality of image data. For example, as shown in FIG. 5B, image data "report: ppt" which is stored in the PC5 may be specified together with the image data "with respect to sales: ppt" stored in the PC4.

In step S12, the control part 50 controls the mail processing part 20 so as to analyze a content of the received E-mail and advances processing to step S13. That is, the control part 50 controls the mail processing part 20 so as to analyze a content of the E-mail received in step S11 and extracts information which contains access information from the E-mail. To be more specific, the control part 50 reads the E-mail received from the RAM 56 and, in accordance with a mail analyzing table shown in FIG. 6, controls the mail processing part 20 so as to analyze the content of the received E-mail. That is, the control part 50 analyzes the content of the received E-mail by setting information described in a From field of the header portion as information on "transmitter", information described in a Date field of the header portion as information on "transmission date and time", information described in a Subject field of the header portion as information on "mail title", information described in a first-row field of the body as information on "presentation title", information described in a second-row field of the body as information on "address of commonly-shared folder", information described in a third-row field of the body as information on "file name", information described in a fourth-row field of the body as information on "password", and information described in a fifth-row field of the body as information on "presentation date and time".

The mail processing part 20 analyzes the content of the E-mail in the above-mentioned manner, and extracts information containing access information. For example, when the header portion and the body of the E-mail are described as shown in FIG. 5A, the control part 50, as shown in FIG. 6, analyzes the address "ito@example" described in the From header field contained in the header portion of the E-mail as information on the transmitter.

In the same manner, the control part 50 analyzes "Mon, 3 Jul. 2006" described in the Date header field of the E-mail as information on transmission date and time, "Presentation" described in the Subject header field of the E-mail as information on mail title, "sales" described in the first row of the body of the E-mail as information on presentation title, "¥¥PC4" and "¥share" described in the second row of the body of the E-mail as identification information on the PC4 and the address information on the commonly-shared folder "share" which the PC4 has respectively, "with respect to sales: ppt" described in the third-row of the body of the E-mail as information for specifying image data stored in the commonly-shared folder "share", "1234" described in the fourth-row of the body of the E-mail as password information for getting access to the commonly-shared folder "share", and "2006/7/5" described in the fifth-row of the body of the E-mail as information on presentation date and time.

The control part 50 stores the analysis result in the RAM 56 for every received E-mail and, at the same time, extracts the storage position specifying information and the password information as access information and stores the information in the RAM 56.

In step 13, the control part 50 determines whether or not the content of the E-mail is normal from the analysis result based on the mail analysis table. That is, the control part 50 determines whether or not an error exists in the analysis result based on the mail analysis table. When the control part 50 determines that there is no error in the analysis result based on the mail analysis table, the control part 50 determines that the content of the E-mail is normal. On the other hand, when the control part 50 determines that an error exists in the analysis result based on the mail analysis table, the control part 50 determines that the content of the E-mail is not normal.

Here, the presence of the error in the analysis result based on the mail analysis table implies that the E-mail lacks the information on the transmitter, the commonly-shared folder and the file name which are at least necessary for acquiring the image data or these information cannot be recognized from the description of the E-mail. For example, when "itoexample" is described in the From header field contained in the header portion of the E-mail and an "@" mark is not described in the From header field, the information cannot be recognized as information on the transmitter and hence, the error exists in the analysis result based on the mail analysis table and hence, the control part 50 determines that the content of the E-mail is not normal.

In this processing, when the control part 50 determines that the content of the E-mail is normal (step S13: Yes), the control part 50 advances processing to step S14.

In step S14, the control part 50 stores the analysis result formed for every received E-mail in the RAM 56 for adding the analysis result as data to be added for forming an E-mail list table, and finishes mail receiving processing.

Further, in step S14, the control part 50 reads and executes the list forming program stored in the ROM 54 so as to form the E-mail list of information which contains at least file name of image data out of the access information based on an analysis result for every E-mail from the RAM 56 and stores the E-mail list in the RAM 56, and finishes the operation of mail receiving processing. For example, the control part 50, as shown in FIG. 7, arranges information on analysis result of the analysis result table and forms an E-mail list which contains, from a left side, a column indicative of information on the mail title on a first row, a column indicative of information on the presentation title on a second row, a column indicative of information on the transmitter on a third row, a column indicative of information on the transmission date and time on a fourth row, a column indicative of information on the presentation date and time on a fifth row, and a column indicative of information on the file name of the image data on a sixth row. In the E-mail list shown in FIG. 7, new information is added to the fourth row of the E-mail list based on the E-mail shown in FIG. 5A.

In step S13, when the control part 50 determines that the content of the E-mail is not normal (step S13: No), mail receiving processing is finished without updating data of E-mail list.

Next, file display processing in step S4 is specifically explained by reference to a flowchart shown in FIG. 8.

As shown in FIG. 8, when the file display processing is started, in step S20, the control part 50 displays an E-mail list, and advances processing to step S21.

To be more specific, the control part 50 takes out data of the E-mail list formed in step S14 from the RAM 56, and writes a drawing image of the E-mail list in the image storage memory 34 of the image processing part 30. An image corresponding to the drawing image of the E-mail list written in the image storage memory 34 is projected on the screen S via the projection part 40 as shown in FIG. 7.

In step S21, the control part 50 determines whether or not the file selection button switch of the control panel P not shown in the drawing is operated so as to select a file of specific image data. The control panel P is configured to select data of desired image file pointed out by a cursor arranged on a left side of the E-mail list as shown in FIG. 7 when a user operates a file selection button switch not shown in the drawing.

In this processing, when the control part 50 determines that the file of the specific image data is not selected (step S21: No), the control part 50 returns processing to step S20.

On the other hand, in this processing, when the control part 50 determines that the file of the specific image data is selected (step S21: Yes), the control part 50 advances processing to step S22 in which the CPU 52 of the control part 50 reads and executes an image data acquisition program stored in the ROM 54, and determines whether or not password information which constitutes an access condition is present in the analysis result of the E-mail relating to the selected image data.

In step S22, when the control part 50 determines that password information is not present in the analysis result of the E-mail relating to the image data selected in step S21 (step S22: No), the control part 50 advances processing to step S24.

On the other hand, in step S22, when the control part 50 determines that password information is present in the analysis result of the E-mail relating to the image data selected in step S21 (step S22: Yes), the control part 50 advances processing to step S23.

In step S23, the control part 50 takes out password information from the RAM 56 by executing the image data acquisition program, sets the password information as a request signal for acquiring the image data, and advances processing to step S24.

In step S24, the control part 50 takes out storage position specifying information from the RAM 56, and transmits the request signal for acquiring the image data to the communication network 2 based on the storage position specifying information thus acquiring the file of the selected image data via the communication network 2, and writing the file of the selected image data to the RAM 56 or a storage device such as a hard disk not shown in the drawing, and advances processing to step S25.

In this manner, the control part 50, based on the storage position specifying information and the password information which constitute the access information, accesses the device which stores the selected image data via the communication network 2 thus acquiring the image data. For example, as shown in FIG. 5A, when the storage position specifying information out of the access information based on the E-mail is "¥¥PC4¥share" and the file name is "with respect to sales. ppt", the control part 50 accesses the commonly-shared folder "share" which the PC 4 connected to the communication network 2 has, and acquires the image data "with respect to sales. ppt" which the commonly-shared folder "share" possesses. Accordingly, the image projection device 1 can easily acquire the desired image data.

The control part 50 also, as shown in FIG. 5A, when the password information is "1234", accesses to the commonly-shared folder "share" based on the password information "1234". Accordingly, even when the password "1234" is set in the commonly-shared folder "share" so that the access to the commonly-shared folder "share" is restricted, it is possible to easily release the password using the E-mail.

In the processing in step S25, the control part 50 forms original image data based on image data (electronic file) using application software started corresponding to image data written in the RAM 56 or a storage device such as a hard disc not shown in the drawing, converts the original image data into a projection image by the image processing part 30, and projects the projection image on the screen S as an image via the projection part 40 thus finishing file display processing.

As described above, in the image projection device 1 of this embodiment, the control part 50 receives the E-mail containing information on the image data which is transmitted from any one of PC3 to PC6 which constitutes other devices connected to the communication network 2, analyzes the content of the received E-mail, and acquires the image data from any one of the PC3, PC4, PC5, PC6 via the communication network 2 based on the analysis result of the analyzed E-mail. Accordingly, this embodiment can provide the image projection device with high user-friendliness which can, without requiring a server for receiving the image data and using the E-mail which is a simple method, arbitrarily designate the image data stored in other devices connected to the communication network and automatically acquire the designated image data.

Although the preferred embodiment of the present invention has been explained heretofore, the present invention is not limited to such an embodiment, and various modifications and variations are conceivable without departing from the gist of the present invention described in claims.

For example, the control part 50 of the image projection device 1 may temporarily release the password set in the commonly-shared folder by transmitting a signal containing password information to the communication network 2 and, thereafter, may transmit a request signal for acquiring image data to the communication network 2 so as to acquire the image data. That is, without setting the password information in the request signal for acquiring the image data, the signal containing the password information is transmitted to the communication network 2 prior to the request signal. Due to such constitution, it is possible to acquire advantageous effects substantially equal to the advantageous effects acquired by the image projection device 1 of this embodiment.

Further, although the control part 50 of the image projection device 1 executes processing of acquiring selected image data when the image data is selected from the E-mail list by the user, the control part 50 may execute processing of automatically acquiring the image data based on information on presentation date and time which constitutes an analysis result of the E-mail. Further, the control part 50 may read the acquired image data from the RAM 56 on the presentation date and time or before the presentation date and time by a predetermined time, and may project the image data on the screen S via the projection part 40.

Due to such constitution, by merely transmitting the E-mail in which the presentation date and time are described to the image projection device 1, a user can omit an operation of selecting image data to be used for presentation from the E-mail list at a presentation site and hence, the user-friendliness of the user who uses the image projection device can be further increased.

Further, when a power source of the PC which stores the image data is turned off at the time of performing the presentation, the image data cannot be acquired and hence, the image projection device 1 may analyze the E-mail and, at the same time, may acquire the image data. In this case, the control part 50 of the image projection device 1 executes a series of processing such that the control part 50 controls the mail processing part 20, analyzes the content of the received E-mail, extracts access information from the E-mail, and acquires image data via the communication network 2 based on the access information.

In executing the processing of acquiring the image data for the first time, when a power source of the PC in which image data is already stored is turned off, the control part 50 of the image projection device 1 may periodically execute processing of acquiring the image data until the power source of this PC is turned on. Due to such constitution, the image projection device 1 can surely acquire the image data to be projected.

Further, based on the E-mail transmitted to the image projection device 1, the information on the image data specified by the E-mail in the E-mail list may be erased or changed. For example, in erasing the information in the E-mail list, a term "erase" is described in a sixth row of the body of the E-mail and the E-mail is transmitted to the image projection device 1. The control part 50 controls the mail processing part 20 so as to analyze that "erase" described in the sixth row of the body of the E-mail is the information indicative of the erasion of the information on the image data specified by the E-mail in the E-mail list, and updates the E-mail list by erasing the information on the image data from the E-mail list.

Due to such operations, the user can erase the image data which is no more used for the presentation from the E-mail list by merely transmitting the E-mail containing the description of "erase" to the image projection device 1.

Further, in an image projection system K which includes the image projection device 1, the mail server 7 may be arranged outside the communication network 2. Even when the mail server 7 is arranged outside the communication network 2 in this manner, the image data is not attached to the E-mail per se and hence, the E-mail per se does not contain useful information, and the transmission and the reception of the image data is performed within the communication network 2 whereby there is no possibility of leaking of information.

Further, the image data may be acquired when the power source of the image projection device 1 is turned on. Further, even when the power source of the image projection device 1 is turned off, the power source of the image projection device 1 may be automatically turned on based on the information on the presentation date and time of the E-mail list thus enabling the acquisition of the image data.

The advantageous effects described in the embodiment of the present invention merely enumerate the most preferable advantageous effects obtained by the present invention, and advantageous effects of the present invention are not limited to the advantageous effects described in the embodiments of the present invention.

What is claimed is:

1. An image projection device which is configured to acquire image data via a communication network and is configured to project an image based on the image data, the image projection device comprising:

a receiving unit which is configured to receive an E-mail transmitted from another device which is connected to the communication network and containing information on the image data;

a content analyzing unit which is configured to analyze a content of the E-mail received by the receiving unit; and an image data acquiring unit which is configured to acquire the image data via the communication network based on an analysis result obtained by the content analyzing unit.

2. An image projection device according to claim 1, wherein the E-mail contains access information for allowing a user to get access to a device which stores the image data via the communication network, the content analyzing unit extracts the access information from the E-mail by analyzing the content of the E-mail, and the image data acquiring unit is configured to acquire the image data by getting access to device which stores the image data based on the extracted access information.

3. An image projection device according to claim 2, wherein the content analyzing unit is configured to extract the access information contained in a specific portion of the E-mail.

4. An image projection device according to claim 3, wherein the specific portion of the E-mail is a body of the E-mail.

5. An image projection device according to claim 3, wherein the specific portion of the E-mail is a header of the E-mail.

6. An image projection device according to claim 2, wherein the E-mail contains storing position specifying information for specifying a position where the image data is stored as the access information, and the storing position specifying information contains identification information on the device which stores the image data, address information on a commonly-shared folder which the device storing the image data has, and information which specifies the image data which the commonly-shared folder possesses.

7. An image projection device according to claim 6, wherein the E-mail contains password information or the user account name information for getting access to the commonly-shared folder as access information.

8. An image projection device according to claim 2, further comprising:

a list table forming unit which is configured to form a list table of information which contains at least a file name of the image data out of the access information based on a content of the E-mail which is analyzed by the content analyzing unit; and an image data selecting unit which is configured to select the image data from the list table; wherein the image data acquiring unit acquires the image data selected by the image data selecting unit.

9. A computer readable recording medium recording a program which is used in an image projection device which acquires image data via a communication network, and projects an image based on the image data, the program causing a computer to execute the steps of:

receiving an E-mail which is transmitted from another device which is connected to the communication network and contains information on the image data;

analyzing a content of the received E-mail; and acquiring the image data via the communication network based on an analysis result of a content of the E-mail.

10. An image projection method which is configured to acquire image data via a communication network and is configured to project an image based on the image data, the image projection method comprising the steps of:

receiving an E-mail which is transmitted from another device which is connected to the communication network and contains information on the image data;

analyzing a content of the received E-mail; and acquiring the image data via the communication network based on an analysis result which is obtained by analyzing a content of the E-mail.

\* \* \* \* \*